Oct. 30, 1951 J. A. JENSEN 2,573,263
VALVE
Filed June 15, 1950 2 SHEETS—SHEET 1

INVENTOR:
James A. Jensen,
BY Paul & Paul
ATTORNEYS.

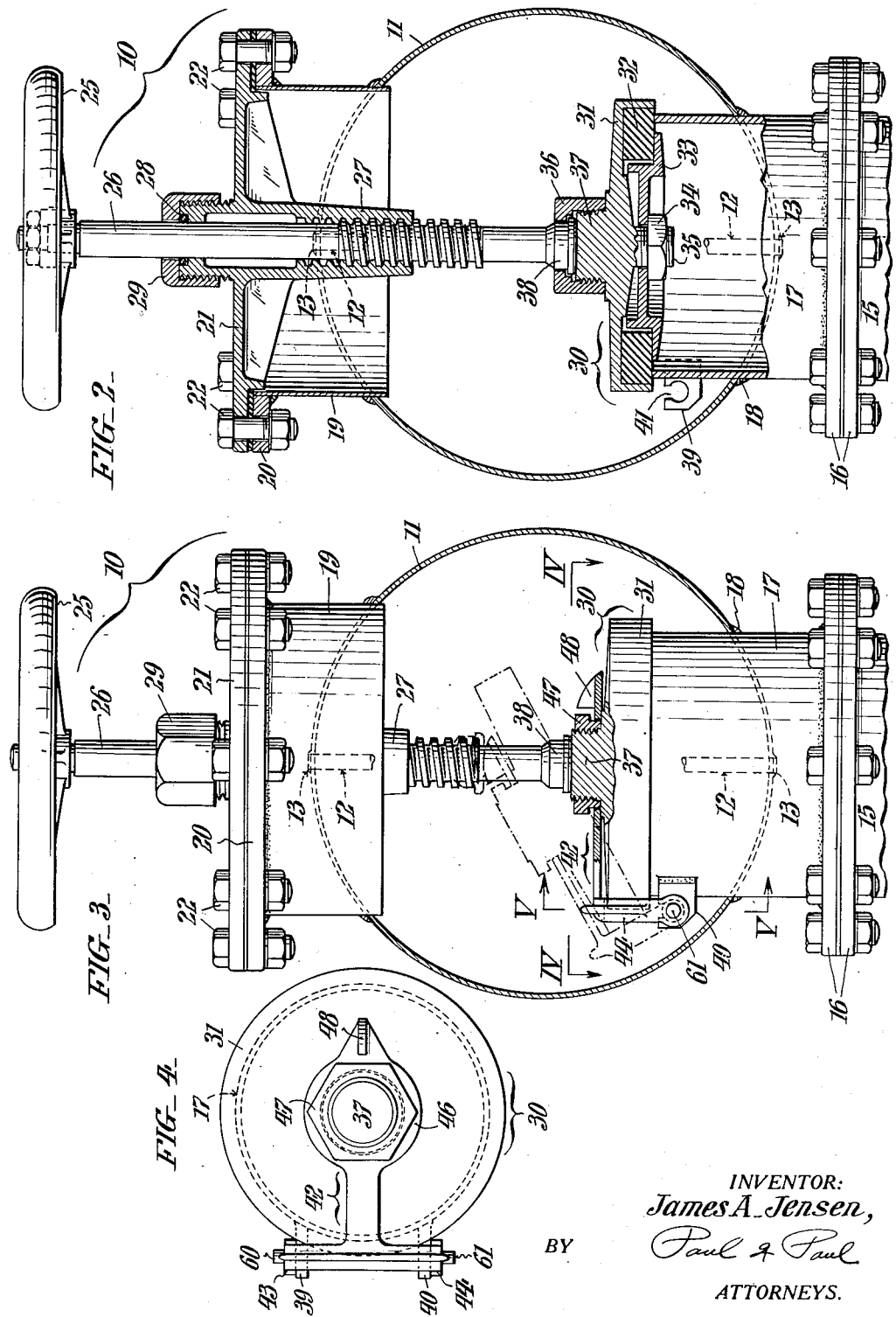

Patented Oct. 30, 1951

2,573,263

UNITED STATES PATENT OFFICE 2,573,263

VALVE

James A. Jensen, Haverford, Pa., assignor to Philadelphia Valve Company, Philadelphia, Pa., a corporation of Pennsylvania Application June 15, 1950, Serial No. 168,287

4 Claims. (Cl. 251—1)

This invention relates to valves. More particularly, it is concerned with manually operable screw spindle valves useful, for example, in multiple in connection with drain manifolds on vehicles ordinarily employed in the delivery of fluid commodities like fuel oils, gasoline, etc., for selective draining of the liquids from individual subdivisions of multi-compartment tanks.

The chief aim of our invention is to enable valves of the kind referred to, to be easily and quickly converted for change from direct axial operation to pivotal or swing check operation, and vice versa.

The change from one condition of operation to the other in valves heretofore designed for such conversions, it was necessary to provide one type of closure element for one condition of operation, and a new and different type of closure element for the other condition of operation, which added considerably to the cost of making the changes. Another aim of my invention is to overcome this drawback, i. e. to enable use of the same closure element for either condition of valve operation and thus minimize the cost of conversion.

How the foregoing and other objectives and important advantages are realized in practice, will appear from the following detailed description of the attached drawings, wherein Fig. 1 is a longitudinal sectional view of a fluid drain manifold with a plurality of incorporated valves conveniently embodying my invention.

Fig. 2 is a cross section of the manifold through the axis of one of the valves, drawn to a larger scale.

Fig. 3 is a view generally like Fig. 2 showing the valve converted for flap operation of its closure element.

Fig. 4 is a view in top plan taken as indicated by the angled arrows IV—IV in Fig. 3.

Figure 1:
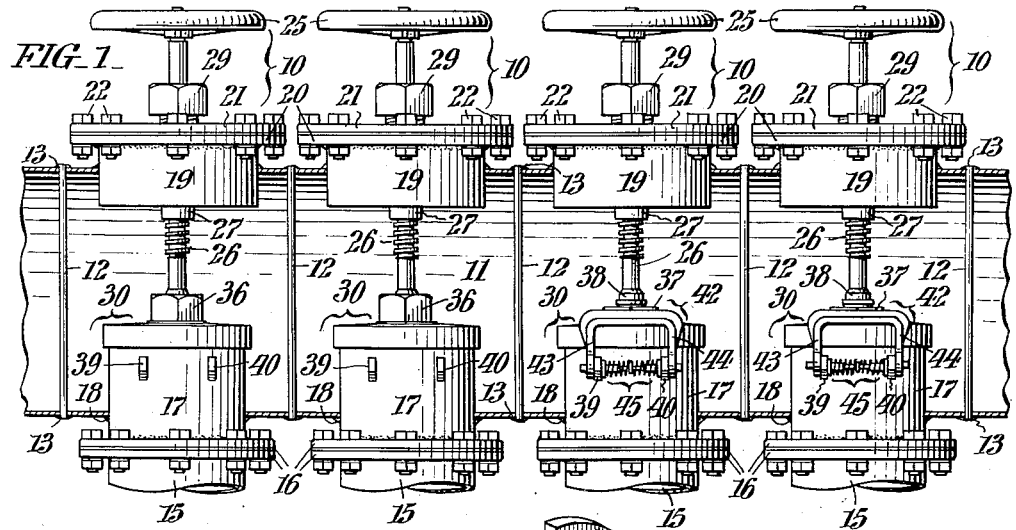

As exemplified in Figs. 1 and 2, the valves 10 are of the screw spindle type and are serially arranged in the manifold 11 which is shown as fashioned from sheet metal and which is reinforced centrally of the intervals between the valves and also beyond the endmost valves of the series by diametral stay rods 12 whereof the opposite ends are permanently secured by welding as conventionally indicated at 13. Pipes 15 leading from different fluid supply sources (not illustrated) are connected, by means of bolted flanges 16, to short tube sections 17 of smaller diameter likewise shown as fashioned from sheet metal, which fit through openings in the bottom of the manifold 11 and which are integrated with the manifold by welding as at 18. Similarly fitted into openings in the top of the manifold in line with the tube sections 17 are similar sheet metal tube sections 19 which are flanged as at 20, and whereto the bonnets 21 of the valves are removably secured by bolts 22. Each valve 10 (Fig. 2) is operable by means of a hand wheel 25 at the top of its spindle 26 which latter is threadedly engaged in an axial boss 27 of the bonnet 21. Fluid leakage around the spindle 26 is prevented by a sealing ring 28 of rubber or the like compressed and held in place by a gland nut 29 screwed onto the protruding upper end of the boss 27 of the bonnet. The closure element 30 of each valve includes a disk 31 which is hollowed out at the bottom for reception of an annular gasket 32 adapted to seat upon the top edge of the corresponding tube section 17. As shown, the gasket 32 is retained by a keeper plate 33 which is backed by a clamp nut 34 in threaded engagement with a pendent axial stud projection 35 of the disk 31. A cap nut 36 screwed onto an upstanding axial stud projection 37 of the disk 31 serves, in cooperation with a flanged head 38 at the bottom end of the stem 26, to loosely connect the closure element 30 to said stem. As a consequence of this loose connection, the element 30 is free to level itself accurately on the valve seat and thus insure tight closure of the valve without straining or binding of the stem 26 in the bonnet 21.

Figure 7:
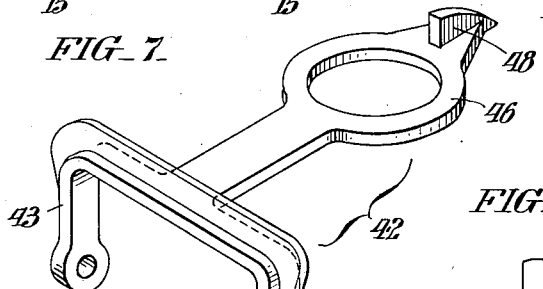
Fig. 7 is a perspective view of one of the elements through which the conversion is effected.

In order to make possible the conversion of any or all of the valves of Figs. 1 and 2 to flap operation in accordance with my invention, I have welded or otherwise permanently secured to each lower tube section 17 adjacent the seat edge, a pair of laterally spaced ears 39, 40, the apertures in said ears having entrant notches 41 at their tops. In addition, I have provided an arm 42 which is separately illustrated in Fig. 7, the same being formed with a yoke whereof the pendent legs 43, 44 are spaced to straddle the ears 39, 40 for pivotal connection to the latter by a pintle means 45. A loop 46 at the distal end of the arm 42 is dimensioned to loosely engage about the neck of a flanged nut 47 which is adapted to be substituted in place of the nut 36 on the upstanding threaded projection 37 of the disk 31. Formed on the distal end of the arm 42 beyond the loop 46 is a rounded cam lug 48 the function of which will be pointed out later herein.

Figures 5, 6:
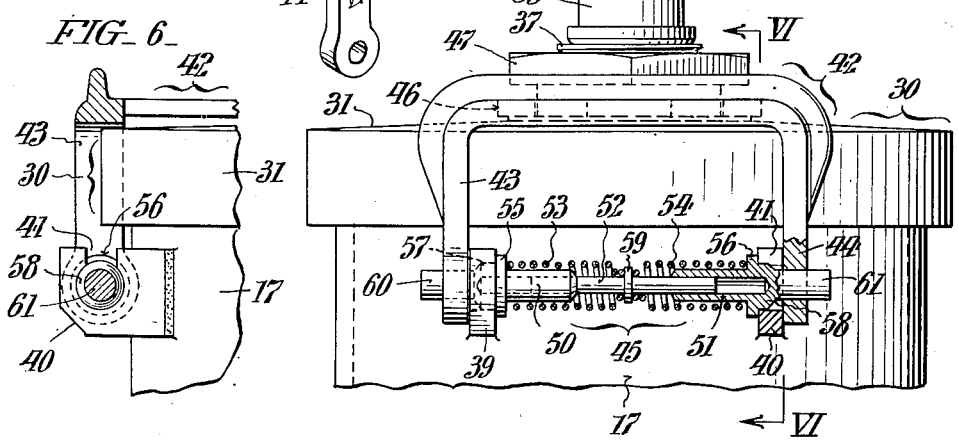
Fig. 5 is a fragmentary view, partly in elevation and partly in section, taken as indicated by the angled arrows V—V in Fig. 3 and drawn to a still larger scale.
Fig. 6 is a fragmentary detail section taken as indicated by the angled arrows VI—VI in Fig. 5.

By reference to Fig. 5, it will be observed that the pintle means 45 is of multi-partite construction, i. e., it comprises two end components 50 and 51 which are axially socketed to telescopically receive the opposite ends of a central connecting component 52. The pintle means further includes surrounding helical springs 53, 54 which are in compression between stop flanges 55, 56 on diametral enlargements 57, 58 medially of the end components 50, 51, and a medial circumferential enlargement 59 on component 52, said enlargements being of a diameter to snugly fit the apertures in the ears 39, 40 as shown in Fig. 5 and being beveled at their outer ends. In practice, the pintle means 45 is initially assembled with the arm 42, with the outer terminals 60, 61 of the components 50, 51 engaged in the apertures of the yoke extremities 43, 44.

In preparation for conversion of the valve from the form shown in Fig. 2 to the form shown in Fig. 3, the bonnet 21 is first withdrawn as a unit with the spindle 26 and the closure element 30, and the latter then disconnected by removal of the nut 36 which may then be discarded. The arm and pintle assembly 42, 45 is next attached to the closure disk 31, this step being done outside of the valve, preferably in a vise. The new assembly 31, 42, 45 and 47, grasped in one hand, is next introduced through the neck 19, and the pintle sections 50, 51 incidentally pushed inward against the action of the springs 53, 54 by pressing upon the ends 60, 61 with the thumb and forefinger until they are flush with the outsides of the yoke extremities 44 of arm 42. While the pintle sections are thus pressed, the ends 60 and 61 are engaged downwardly into the notches 41 in the ears 40 with the enlargements 57, 58 clearing the inner sides of the ears in aligned relation to the rounded apertures in said ears. With this accomplished, the pintle sections 50, 51 are released, and upon being released are immediately thrust outward by the springs 53, 54 for passage of the enlargements 57, 58 into the apertures in the ears 44 until stopped by engagement of the flanges 55, 56 with said ears. It will be readily apparent that the last described step is greatly facilitated by camming action of the bevels on the enlargements 57, 58 of the pintle sections 50, 51 with the inner sides of the ears 39 and 40. Finally the bonnet 21 is replaced upon the neck 19 and made fast with the bolts 22. Thus, in accordance with my invention, conversion of the valve from direct axial operation to flap operation is accomplished easily, quickly and inexpensively, without necessitating the aid of any special tools or the substitution of an entirely new closure element as required in connection with valves heretofore designed for such conversion. In operation, as the valve spindle 26 is backed off, the closure element 30 will be swung about the pintle axis to the open position in which it is shown in dash and dot lines in Fig. 3 by action of fluid entering through the pipe 17. As the spindle 26 is subsequently turned to shut the valve against fluid pressure, the closure element 30 will be started downward through cooperation of the rounded cam projection 48 on the arm 42 with the bottom end of said spindle. As the downward movement continues, the bottom of the stem 26 will eventually engage the upward stud projection 37 of the disk 31 and finally bear fully upon said projection to press the closure element 30 tightly to its seat. The welded multipartite construction of the manifold and valve bodies is claimed in a separate patent application filed Serial No. 241,825 by me on August 14, 1951.

Having thus described my invention, I claim:

1. Conversion means for a valve having a body and a seat around an inlet port within the body, a discous closure element to cooperate with the seat, a removable bonnet connected to the body, an actuating stem screw engaged axially of the bonnet and having a circumferential flange at its inner end, and a cap nut threadedly engaged with an upstanding axial boss on the closure element and cooperative with the circumferential flange of the stem to loosely connect the element to the stem, said conversion means comprising a pair of laterally-spaced pierced ears on the body adjacent the valve seat; an arm insertable upon removal of the bonnet, said arm having a loop at its distal end to engage loosely over the boss on the closure element after removal of the nut, and a yoke portion to span the ears at the valve seat; a longitudinally-contractable pintle means with outwardly spring biased end components to engage through the ears aforesaid and into apertures in the extremities of the yoke portion of said arm; and a substitute nut to engage the boss on the closure element and having a circumferential shoulder to overreach the loop of the arm.

2. The invention according to claim 1, wherein the end components of the pintle means are axially socketed; and wherein an intermediate connecting component has its opposite ends telescopically engaged in the axial sockets of said end components.

3. The invention according to claim 1, wherein the end components of the pintle means are axially socketed; wherein an intermediate connecting component has its opposite ends telescopically engaged in the axial sockets of said end components; and wherein surrounding helical springs are in compression between a circumferential projection centrally of the intermediate component and serve to maintain circumferential flanges on the end components yieldingly engaged with the inside faces of the ears.

4. The invention according to claim 1, wherein the ears have approach notches at the top; wherein the pintle means is initially assembled with the arm; and wherein the end components of the pintle means have medial circumferential enlargements to snugly fit the apertures in the ears, and circumferential stop flanges on said enlargements, the distal ends of said enlargements being beveled for camming action with the inner faces of the ears as the outer terminals of the end components are pressed downwardly into the notches, whereby the pintle means is temporarily contracted longitudinally until the end components are finally forced outward by spring action and their circumferential enlargements snapped into the apertures in the ears as far as permitted by the stop flanges aforesaid.

JAMES A. JENSEN.

REFERENCES CITED

The following references are of record in the file of this patent:

UNITED STATES PATENTS

| Number | Name | Date |
|---|---|---|
| 406,950 | Parsons | July 16, 1889 |
| 770,154 | Berkey et al. | Sept. 13, 1904 |
| 961,738 | Stickel | June 14, 1910 |
| 1,417,770 | Schaefer | May 30, 1922 |
| 2,453,413 | DeFrees | Nov. 9, 1948 |